US007602795B1

(12) United States Patent
Mazza-Deblauwe

(10) Patent No.: US 7,602,795 B1
(45) Date of Patent: Oct. 13, 2009

(54) METHOD AND SYSTEM FOR IDENTIFYING A MOBILE STATION TO A CONTENT SERVER

(75) Inventor: Tania Mazza-Deblauwe, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 874 days.

(21) Appl. No.: 10/832,922

(22) Filed: Apr. 26, 2004

Related U.S. Application Data

(63) Continuation-in-part of application No. 10/223,940, filed on Aug. 20, 2002.

(51) Int. Cl.
*H04L 12/56* (2006.01)

(52) U.S. Cl. .................................... 370/401; 370/466

(58) Field of Classification Search ................. 370/329, 370/349, 389, 392, 466
See application file for complete search history.

(56) References Cited

U.S. PATENT DOCUMENTS

| | | | |
|---|---|---|---|
| 5,964,891 A | 10/1999 | Caswell et al. | |
| 6,021,126 A | 2/2000 | White et al. | |
| 6,085,222 A | 7/2000 | Fujino et al. | |
| 6,119,160 A | 9/2000 | Zhang et al. | |
| 6,151,628 A | 11/2000 | Xu et al. | |
| 6,161,008 A | 12/2000 | Lee et al. | |
| 6,272,129 B1 | 8/2001 | Dynarski et al. | |
| 6,298,383 B1 | 10/2001 | Gutman et al. | |
| 6,308,267 B1 * | 10/2001 | Gremmelmaier | 713/168 |
| 6,389,008 B1 | 5/2002 | Lupien et al. | |
| 6,404,754 B1 | 6/2002 | Lim | |
| 6,427,170 B1 | 7/2002 | Sitaraman et al. | |
| 6,438,223 B1 | 8/2002 | Eskafi et al. | |
| 6,445,922 B1 * | 9/2002 | Hiller et al. | 455/433 |
| 6,460,081 B1 | 10/2002 | Doherty et al. | |
| 6,463,055 B1 | 10/2002 | Lupien et al. | |
| 6,466,571 B1 | 10/2002 | Dynarski et al. | |
| 6,469,998 B1 | 10/2002 | Burgaleta Salinas et al. | |
| 6,473,609 B1 | 10/2002 | Schwartz et al. | |
| 6,483,822 B1 | 11/2002 | Lioy et al. | |
| 6,553,022 B2 | 4/2003 | Hartmaier | |
| 6,639,912 B1 | 10/2003 | Christie et al. | |

(Continued)

FOREIGN PATENT DOCUMENTS

EP   1 248 484 A1   10/2002

(Continued)

OTHER PUBLICATIONS

Internet Engineering Task Force, Request for Comments 2138, "Remote Authentication Dial in User Service (RADIUS)," C. Rigney, Apr. 1997.

(Continued)

*Primary Examiner*—Phuc H Tran

(57) ABSTRACT

A gateway receives network presence information regarding a mobile station. The network presence information is based, at least in part, on status messages that a network access server, such as a packet data serving node (PDSN), sends, for example, to an accounting server. The network presence information identifies the mobile station, such as by Internet Protocol (IP) address, network access identifier (NAI), and/or mobile directory number (MDN). When the gateway receives a request from a mobile station to access a content server, e.g., an HTTP GET request, the gateway inserts identifying information, such as NAI and/or MDN, into the request to identify the mobile station to the content server.

27 Claims, 4 Drawing Sheets

U.S. PATENT DOCUMENTS

| | | | |
|---|---|---|---|
| 6,658,095 B1 | 12/2003 | Yoakum et al. | |
| 6,678,265 B1 | 1/2004 | Kung et al. | |
| 6,834,300 B1 | 12/2004 | Barna et al. | |
| 6,944,150 B1 | 9/2005 | McConnell et al. | |
| 6,977,917 B2 | 12/2005 | Skog et al. | |
| 6,985,479 B2* | 1/2006 | Leung et al. | 370/352 |
| 7,065,067 B2 | 6/2006 | Song et al. | |
| 7,123,594 B2 | 10/2006 | Yang | |
| 7,136,372 B1 | 11/2006 | Nilsen | |
| 7,165,122 B1 | 1/2007 | Sitaraman et al. | |
| 7,305,429 B2* | 12/2007 | Borella | 709/203 |
| 2001/0028636 A1* | 10/2001 | Skog et al. | 370/328 |
| 2001/0034224 A1 | 10/2001 | McDowell et al. | |
| 2002/0035605 A1 | 3/2002 | McDowell et al. | |
| 2002/0077897 A1 | 6/2002 | Zellner et al. | |
| 2002/0086672 A1 | 7/2002 | McDowell et al. | |
| 2002/0116338 A1 | 8/2002 | Gonthier et al. | |
| 2002/0126701 A1 | 9/2002 | Requena | |
| 2002/0186696 A1 | 12/2002 | Lim | |
| 2002/0187781 A1 | 12/2002 | Furlong | |
| 2003/0018704 A1 | 1/2003 | Polychronidis et al. | |
| 2003/0028621 A1 | 2/2003 | Furlong et al. | |
| 2003/0046400 A1 | 3/2003 | Friel et al. | |
| 2003/0048195 A1 | 3/2003 | Trossen | |
| 2003/0154293 A1 | 8/2003 | Zmolek | |
| 2004/0141500 A1 | 7/2004 | Pavlak et al. | |
| 2004/0176128 A1 | 9/2004 | Grabelsky et al. | |
| 2004/0260816 A1 | 12/2004 | Skog et al. | |
| 2005/0085218 A1 | 4/2005 | Clayton | |
| 2005/0096048 A1 | 5/2005 | Clare et al. | |
| 2005/0119000 A1 | 6/2005 | Nasielski et al. | |
| 2005/0233776 A1 | 10/2005 | Allen et al. | |
| 2006/0019708 A1 | 1/2006 | Raman et al. | |
| 2006/0133341 A1 | 6/2006 | Chari et al. | |
| 2006/0149814 A1* | 7/2006 | Borella | 709/204 |
| 2006/0209768 A1 | 9/2006 | Yan et al. | |
| 2007/0124472 A1 | 5/2007 | Requena | |

FOREIGN PATENT DOCUMENTS

| | | |
|---|---|---|
| EP | 1 251 671 A2 | 10/2002 |
| WO | WO 00/04689 A1 | 1/2000 |
| WO | WO 01/78425 A1 | 10/2001 |
| WO | WO 02/43351 A2 | 5/2002 |

OTHER PUBLICATIONS

Internet Engineering Task Force, Request for Comments 2139, "RADIUS Accounting," C. Rigney, Apr. 1997.

Internet Engineering Task Force, Request for Comments 2486, "The Network Access Identifier," B. Aboba, Jan. 1999.

Internet Engineering Task Force, Request for Comments 3261, "SIP: Session Initiation Protocol," J. Rosenberg, Jun. 2002.

Internet Engineering Task Force, Internet Draft, "A Lightweight Presence Information Format (LPIDF)," J. Rosenberg, et al., Jun. 2000.

Internet Engineering Task Force, Internet Draft, "Event Notification in SIP," A. Roach, Nov. 2000.

Internet Engineering Task Force, Internet Draft, "SIP Extensions for Presence," Rosenberg, et al., Mar. 2001.

Internet Engineering Task Force, Internet Draft, "SIP-Specific Event Notification," A. Roach, Jul. 2001.

Internet Engineering Task Force, Internet Draft, "Session Initiation Protocol (SIP) Extensions for Presence," J. Rosenberg, May 2002.

Internet Engineering Task Force, Internet Draft, "Diameter Base Protocol," P. Calhoun, Jun. 2002.

"Wireless Application Protocol WAP 2.0 Technical White Paper," Wireless Application Protocol Forum Ltd. Jan. 2002.

"Wireless Application Group User Agent Profile Specification," Wireless Application Protocol Forum Ltd., Nov. 1999.

"Composite Capability/Preference Profiles (CC/PP): A user side framework for content negotiation," W3C Note Jul. 27, 1999, http://www.w3or/TR/1999/NOTE-CCPP-19990727.

"Composite Capabilities/Preference Profiles: Requirements and Architecture," W3C Working Draft Jul. 21, 2000, http://www.w3.org/TR/2000/WD-CCPP-ra-20000721/.

Composite Capability/Preference Profiles (CC/PP): Structure and Vocabularies, W3C Working Draft Mar. 15, 2001, http://www.w3.org/TR/2001/WD-CCPP-struct-vocab-20010315.

Internet Engineering Task Force, Internet Draft, "Early implementation of the Services in PSTN requesting Internet Services (SPIRITS) protocol," V. Gurbani, Feb. 2003.

Internet Engineering Task Force, Internet Draft, "The SPIRITS Protocol," V. Gurbani, Feb. 2002.

Internet Engineering Task Force, Internet Draft, "Network Intelligence for Presence Enhanced Communication," W. Montgomery, Nov. 2001.

Internet Engineering Task Force, Request for Comments 3256, "Session Initiation Protocol (SIP)-Specific Event Notification," A. Roach, Jun. 2002.

M. Day et al., "A Model for Presence and Instant Messaging," Request for Comments 2778, Feb. 2000.

L. Slutsman et al., "The SPIRITS Architecture," Request for Comments 3136, Jun. 2001.

* cited by examiner

METHOD AND SYSTEM FOR IDENTIFYING A MOBILE STATION TO A CONTENT SERVER

CROSS-REFERENCE TO RELATED APPLICATIONS

This application is a continuation-in-part of U.S. application Ser. No. 10/223,940, filed on Aug. 20, 2002, which is fully incorporated herein by reference.

BACKGROUND

1. Field of the Invention

The present invention relates to telecommunications and, more particularly, to methods and systems for identifying a mobile station to a content server.

2. Description of Related Art

Wireless telecommunications technologies are continuing to develop in order to provide enhanced multimedia (e.g., data) service to wireless devices. The effort is currently referred to as third-generation wireless or "3G." For example, the IS-2000 specification describes a CDMA air interface for 3G, and the IS-835 specification and various specifications of the Third Generation Partnership Project 2 ("3GPP2") describe the operation of third-generation wireless networks.

As presently envisioned, a 3G network includes a packet-switched network that wireless customers can access to connect to the Internet, browse the World Wide Web, send and receive e-mails, etc. One difficulty in providing such services to wireless customers is that they often use devices, such as wireless telephones and personal digital assistants (PDAs), that have limited capabilities. For example, such devices may not be able to display the graphics that laptop and desktop computers are able to display because of less pixel resolution, less color resolution, and/or smaller screens. In addition, handheld wireless devices often have differently-structured user interfaces, such as smaller keypads or pen-based input. As a result, while most Web content is currently written in the HyperText Markup Language (HTML), Web browsers on handheld wireless devices often require Web content to be written in specialized markup languages, such as the Wireless Markup Language (WML) or the Handheld Device Markup Language (HDML), or in specialized versions of HTML, such as cHTML or xHTML.

To accommodate such wireless customers, the 3G network may include various applications to provide service tailored to devices with limited capabilities. For example, the 3G network may include a Web gateway that wireless customers access to receive Web content, e.g., by using the Wireless Application Protocol (WAP). The Web gateway may receive content from a content server at a URL specified by the customer and then transcode or render the content to facilitate its display on the particular device the wireless customer is using. The Web gateway may also apply a customer's preferences when providing the content to the customer. As a result, it is preferable for the Web gateway to have information regarding the particular customer and wireless device receiving the content in order to transcode or render the content appropriately and in order to apply the customer's preferences.

In many implementations, however, the Web gateway or other application may not be able to obtain reliable information identifying the customer it is serving or the particular device the customer is using. For example, the Web gateway or other application may only know the IP address of the customer it is serving. In many cases, this IP address does not reliably identify the customer because it may be dynamically assigned. Thus, a particular customer may use a particular IP address only for a particular session. When that customer's session ends, e.g., because the customer has logged off, turned off the wireless device, moved out of range, or for some other reason, the same IP address may be assigned to a different customer. This may lead to the undesirable situation of the Web gateway or other application applying the first customer's profile to the second customer simply because the second customer was assigned the same IP address. In addition, the customer's IP address does not typically indicate what device the customer is using for network access. Indeed, even the identity of the customer may not reliably indicate what device the customer is using, because a customer may use different devices with different capabilities to access the network at different times.

This lack of reliable identifying information can be a problem for content servers as well as for the Web gateway. For example, in order to grant a particular customer access to its applications or services, a content server may require the customer to present one or more valid identifiers, such as a network access identifier (NAI), which identifies the customer, and/or mobile directory number (MDN), which identifies the particular device the customer is using. Although some customer devices may be able to include the necessary identifying information in requests, e.g., HTTP GET requests, sent to content servers, this approach can create additional problems. For example, this insertion process can create an undesirable amount of overhead. In addition, requests sent with such identifying information may be less secure. Finally, many customer devices may be unable to operate in this way, i.e., may be unable to include the necessary identifying information in requests.

Accordingly, there is a need to obtain reliable information regarding what IP address a particular customer is using and reliable information that identifies the particular customer and/or the particular device the customer is using for network access.

SUMMARY

In a first principal aspect, an exemplary embodiment of the present invention provides a method for communication between a mobile station and a content server. The mobile station is identified by at least a first identifier (e.g., an IP address) and a second identifier (e.g., NAI or MDN). In accordance with the method, a correlation is obtained between the first identifier and the second identifier. An access request, requesting access to selected content, is received from the mobile station. The access request includes the first identifier. The second identifier is determined based on the first identifier and the correlation. Identifying information is inserted into the access request to provide a modified access request. The identifying information includes at least the second identifier. The modified access request is transmitted to the content server.

In a second principal aspect, an exemplary embodiment of the present invention provides a method for communication between a mobile station and a content server, via a gateway. The mobile station is identified by at least a first identifier (e.g., an IP address), a second identifier (e.g., NAI), and a third identifier (e.g., MDN). In accordance with the method, a network presence server transmits network presence information regarding the mobile station to the gateway. The network presence information includes at least the first identifier and the second identifier. The gateway stores the network presence information. The gateway receives an access request, requesting access to selected content, from the mobile station. The access request includes the first identifier. The gateway determines the second identifier based on the first identifier and the network presence information. The gateway inserts at least the second identifier into the access request to provide a modified access request, and the gateway transmits the modified access request to the content server.

In a third principal aspect, an exemplary embodiment of the present invention provides a system for identifying a mobile station to a content server. The system comprises a gateway and a network presence server. The gateway inserts at least one identifier (e.g., NAI and/or MDN) into access requests from the mobile station to identify the mobile station to the content server. The network presence server transmits network presence information regarding the mobile station to the gateway. The network presence information includes the at least one identifier.

DETAILED DESCRIPTION OF EXEMPLARY EMBODIMENTS

1. Exemplary Architecture

Figure 1:
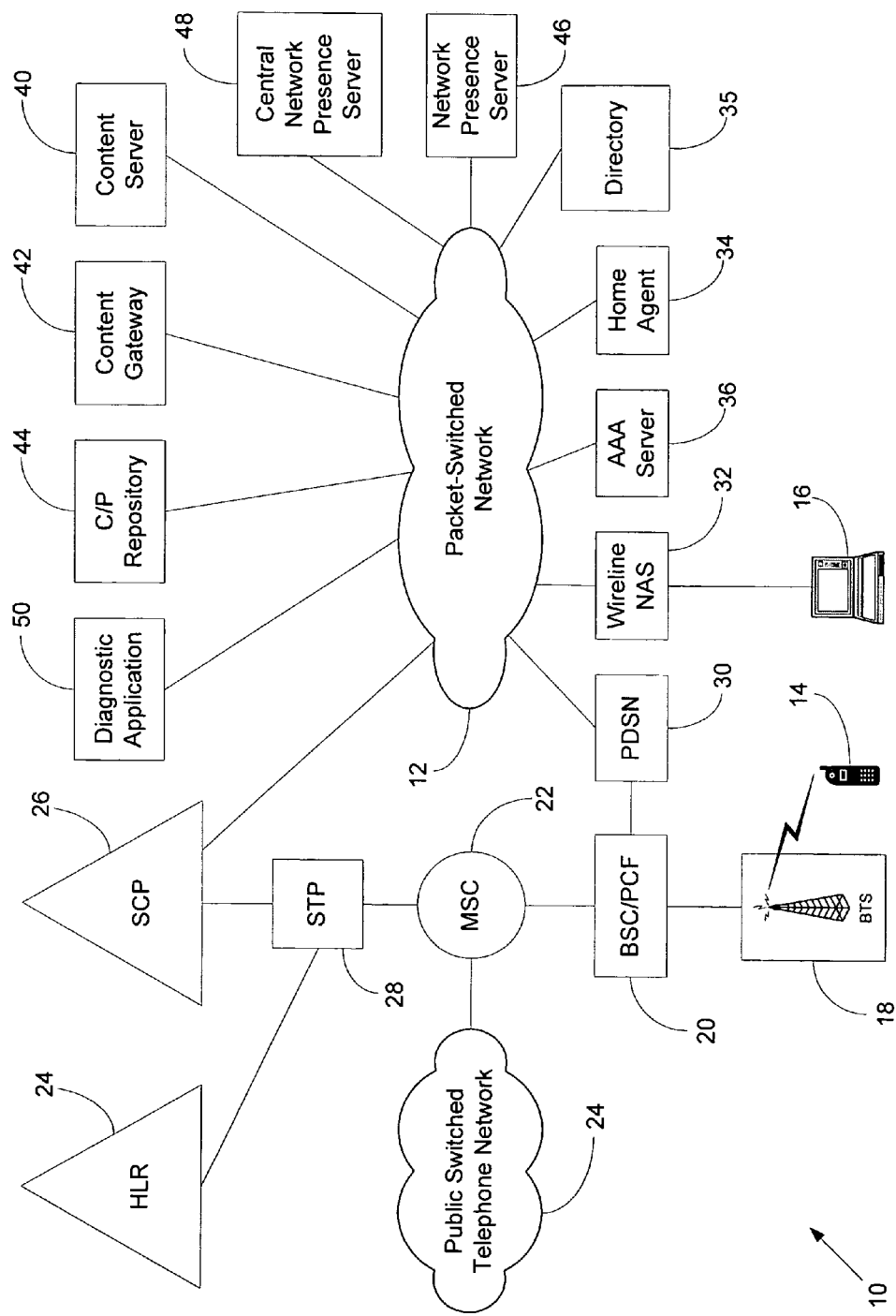
FIG. 1 is a simplified block diagram of a wireless telecommunications system, in accordance with an exemplary embodiment of the present invention.

Referring to the drawings, FIG. 1 is a simplified block diagram of an exemplary telecommunications system 10 in which exemplary embodiments of the present invention may be employed. Telecommunications system 10 includes a packet-switched network 12. Packet-switched network 12 may include one or more wide area networks (WANs) and/or one or more local area networks (LANs). Packet-switched network 12 may include one or more public networks, such as the Internet, and/or one or more private networks. Packets may be routed in packet-switched network 12 using the Internet Protocol, and devices in communication with packet-switched network 12 may be identified by a network address, such as an Internet Protocol (IP) address.

A customer may use a customer device for communicating over packet-switched network 12. The customer device may be a wireless device, such as mobile station 14. Mobile station 14 may be a wireless telephone, a personal digital assistant (PDA), a wirelessly equipped laptop computer, or other type of wireless communication device, i.e., a communication device that communicates over an air interface. Alternatively, the customer device may be a wireline device, such as wireline device 16. Although wireline device 16 is shown as a laptop computer in FIG. 1, wireline device 16 may be a desktop computer, PDA, or other device that communicates over a physical interface other than an air interface. In some cases, a given customer device may have both wireless and wireline communication capability. In addition, a customer may, at different times, use different types of wireless and/or wireline devices to communicate over packet-switched network 12. In some cases, a customer may be able to use more than one customer device at a time to communicate over packet-switched network 12.

To provide communications to wireless customer devices, wireless telecommunications system 10 may includes a base transceiver station (BTS) 18 that provides a wireless coverage area. BTS 18 may communicate over an air interface with one or more wireless communication devices, such as mobile station 14, located in its wireless coverage area. The communications between BTS 18 and mobile station 14 may occur in a digital format, such as CDMA, TDMA, GSM, or 802.11x, or they may occur in an analog format, such as AMPS. A preferred wireless communications format is "CDMA 2000," such as described in EIA/TIA/IS-2000 Series, Rev. A (published March 2000), which is incorporated herein by reference.

BTS 18 may be controlled by a base station controller (BSC) 20, which, in turn, may be controlled by a mobile switching center (MSC) 22. MSC 22 may be connected to the public switched telephone network (PSTN) 24. MSC 22 may able to communicate with a home location register (HLR) 24 and a service control point (SCP) 26, typically, via one or more signal transfer points (STPs), such as STP 28. Although FIG. 1 shows MSC 22 connected to one BSC and shows BSC 20 connected to one BTS, in general, MSC 22 may be connected to more than one BSC and each BSC, such as BSC 20, may be connected to more than one BTS.

MSC 22 may use a signaling system, such as SS7, to route calls through PSTN 24. The signaling between MSC 22 and HLR 24 may conform to IS-41 specifications. A recent revision of the IS-41 specifications, ANSI-41 Rev. D, published in July 1997, is incorporated herein by reference. The signaling between MSC 22 and SCP 26 may conform to the specification "Wireless Intelligent Network," TIA/EIA/IS-771, published in July 1999, which is incorporated herein by reference. Other signaling protocols could be used, however. By the use of such signaling, MSC 22, BSC 20, and BTS 18 may be able to connect incoming calls from PSTN 24, which calls may originate from landline telephones, mobile stations, or other communication devices, to mobile station 14. Similarly, serving MSC 22, BSC 20, and BTS 18 may be able to connect calls originating from mobile station 14 through PSTN 24.

To provide wireless customer devices, such as mobile station 14, access to packet-switched network 12, BSC 20 may include a packet control function (PCF), and a packet data serving node (PDSN) 30 may connect BSC/PCF 20 to packet-switched network 12. The communications between BSC/PCF 20, MSC 22, and PDSN 30 may conform to "third generation" (3G) wireless network specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference. Briefly stated, under these 3G specifications, when mobile station 14 requests packet data service, BSC/PCF 20 may engage in signaling with MSC 22 and with PDSN 30 to authenticate and authorize mobile station 14 and to set up a data link with PDSN 30. If this process is successful, a point-to-point protocol (PPP) session is established between mobile station 14 and PDSN 30. PDSN 30 then acts as a network access server, providing mobile station 14 access to packet-switched network 12.

Telecommunications network 10 may also include a wireline network access server (NAS) 32 to provide wireline customer devices, such as wireline device 16, access to packet-switched network 12. A wireline customer device may, for example, be able to connect to wireline NAS 32 via a telephone line (e.g., by using a modem), digital subscriber line (DSL), data-over-cable system, T1 line, or some other wired connection.

A customer device communicatively coupled to packet-switched network 12 is typically identified by a network address, such as an IP address. The customer device may use either Simple IP or Mobile IP, and its IP address may be dynamically assigned. In a Simple IP process, PDSN 30 dynamically assigns IP addresses to wireless customer devices, such as mobile station 14, communicating with it, and wireline NAS 32 dynamically assigns IP addresses to wireline customer devices, such as wireline device 16, communicating with it.

In a Mobile IP process, mobile station 14 may send a registration request, via PDSN 30, to a home agent 34 associated with mobile station 14. If home agent 34 approves the registration request, home agent 34 may dynamically assign mobile station 14 an IP address, or mobile station 14 may use an IP address permanently assigned to it. Wireline NAS 32 may similarly forward Mobile IP requests from wireline customer devices communicating with it, such as wireline device 16, to home agent 34. Relevant aspects of Mobile IP are described in C. Perkins, "IP Mobility Support," Request for Comments 2002 (October 1996) and P. Calhoun and C. Perkins, "Mobile IP Network Access Identifier Extension for Ipv4," Request for Comments 2794 (March 2000), which are incorporated herein by reference.

In addition to IP address, a customer device may be identified in other ways. For example, mobile station 14 may be identified by a mobile station identification (MSID) and/or by a mobile directory number (MDN). Similarly, a customer may be identified by a network access identifier (NAI). The NAI may conform to B. Aboba, "The Network Access Identifier," Request for Comments 2486 (January 1999), which is incorporated herein by reference. In some cases, an NAI or other user identifier, may also serve as a device identifier, e.g., if the customer uses only one customer device.

To keep track of the various user identifiers and/or device identifiers, network 10 may include a directory 35. Directory 35 may store information regarding what various device identifiers, such as MSIDs and MDNs, relate to the same device. Directory 35 may also store information regarding what customer devices, e.g., identified by MSID and/or MDN, each customer, e.g., identified by NAI, is authorized to use. In this way, directory 35 may relate device identifiers, such as MSID and MDN, and/or user identifiers, such as NAI, to each other.

Various network elements may be able to query directory 35 to obtain this identification information. As one example, a network element may be able to query directory 35 to determine the MDN that is used by a customer device with a particular MSID. As another example, a network element may be able to query directory 35 to determine what MDN is used by a customer identified by a particular NAI. Directory 35 may also be able to answer other types of queries, depending on the type of information stored by directory 35. In an exemplary embodiment, the queries may conform to the Lightweight Directory Access Protocol (LDAP). However, other protocols could be used.

PDSN 30 and wireline NAS 32 may also exchange messages with an authentication, authorization, and accounting (AAA) server 36, such as via packet-switched network 12. This communication may conform to the RADIUS protocols specified in "Remote Authentication Dial In User Service (RADIUS)," Request For Comments 2138 (April 1997) and "RADIUS Accounting," Request For Comments 2139 (April 1997), which are incorporated herein by reference. Alternatively, the communications with AAA server 36 may conform to the DIAMETER protocol specified in Calhoun, et al., "Diameter Base Protocol," Internet-Draft (June 2002), or to some other protocol.

PDSN 30 and wireline NAS 32 may query AAA server 36 to authenticate and authorize requests by customer devices, such as mobile station 14 or wireline device 16, for access to packet-switched network 12. PDSN 30 may also send to AAA server 36 status messages, such as RADIUS accounting START and STOP messages, regarding the services provided to wireless customer devices. In accordance with the RADIUS accounting protocol, PDSN 30 may generate a RADIUS accounting START message when PDSN 30 begins transmitting data to or receiving data from mobile station 14. Thus, a RADIUS accounting START message typically indicates that a new data session has been initiated or that a existing data session that was dormant has become active.

In accordance with the RADIUS accounting protocol, PDSN 30 may generate a RADIUS accounting STOP message when the data session of mobile station 14 becomes dormant. The data session becomes dormant when no data traffic to or from mobile station 14 occurs for a certain period of time, such as ten seconds. PDSN 30 also generates a RADIUS accounting STOP message when the data session of mobile station 14 has terminated. The data session may terminate because mobile station 14 has logged out, turned off, moved out of range, or because no data traffic has occurred over a sufficient period of time. A RADIUS accounting STOP message may include a count of the number of data bytes transmitted to mobile station 14 and a count of the number of data bytes received from mobile station 14. A RADIUS accounting STOP message may also indicate whether the data session of mobile station 14 has ended or is simply dormant, i.e., is being continued. Wireline NAS 32 may send similar status messages, i.e., RADIUS accounting START and STOP messages, to AAA server 36 regarding the services provided to wireline customer devices, such as wireline device 16.

Although FIG. 1 shows only one PDSN, wireline NAS, AAA server, and home agent connected to packet-switched network 12, in general, multiple PDSNs, wireline NASs, AAA servers, and home agents may be connected to network 12. Moreover, each AAA server may be associated with a particular set of one or more PDSNs and/or wireline NASs, in that those PDSNs and/or wireline NASs send authentication requests and status messages to that particular AAA server.

When communicating over packet-switched network 12, customer devices, such as mobile station 14 or wireline device 16, may receive content from one or more content servers, such as content server 40. Such content may include voice, text, data, software, graphics, video, or other media. Content server 40 may be a Web server, e-mail server, streaming multimedia server, or other application that originates content. Content server 40 may provide content in response to a request from a customer device. Alternatively, content server 40 may push content to a customer device.

Content server 40 may provide content to customer devices via a content gateway 42. Content gateway 42 may transcode or render the content to tailor it for a particular type of customer device. Content gateway 42 may also apply customer preferences in providing the content to a particular customer. To find out how to transcode or render the content and what a customer's preferences are, content gateway 42 may obtain a profile of device capabilities and customer preferences from a capabilities and preferences (C/P) repository 44.

Content gateway 42 may also perform other functions. For example, in some embodiments customer devices may communicate with content server 40 via the Wireless Application Protocol (WAP), in which case content gateway 42 may function as a WAP proxy or gateway. Although content gateway 42 is shown as one network element in FIG. 1, content gateway 42 may be a distributed system made up of multiple servers, proxies, and/or gateways.

Telecommunications network 10 may also include a network presence server 46. As described in more detail below, network presence server 46 is an application that obtains network presence information, i.e., information regarding the network presence of customer devices and provides the network presence information to at least one destination. As used herein, the "network presence" of a customer device refers to the state of its connectivity with packet-switched network 12. Thus, network presence information may encompass such information as whether the customer device has a network connection and, if so, any information that relates to that network connection, such as network addresses that relate to the customer device, the identity of the customer and customer device, and the state of the customer device's data session, such as whether it is active or dormant.

Network presence server 46 may be provided as machine language instructions stored in a data store and executable by one or more processors, such as microprocessors. The data store may be volatile, such random access memory (RAM), or it may be non-volatile, such as read-only memory (ROM), magnetically encoded tape, magnetically encoded disk, or optically encoded disk.

In some embodiments, network presence server 46 may be a stand-alone network element, such as shown in FIG. 1. In other embodiments, network presence server 46 may be co-located with another network element, such as AAA server 36. In still other embodiments, network presence server 46 may be distributed over multiple network elements.

Various destinations may receive the network presence information from network presence server 46. The destination may be an application that provides content to customer devices, such as content server 40 or content gateway 42. In other cases, the destination may be an application that serves other functions. For example, the application may be a diagnostic application 50 used for troubleshooting. The destination may also be a data store that stores network presence information.

The destination or destinations may also include a central network presence server 48. As noted above, multiple AAA servers may be connected to packet-switched network 12. Thus, telecommunications network 10 may include multiple network presence servers, with each network presence server being associated with a particular set of one or more AAA servers. As a result, each network presence server may have network presence information with respect to only part of telecommunications network 10. However, network presence servers may forward some or all of their network presence information to central network presence server 48. In this way, central network presence server 48 may serve as a central repository of network presence information that other network elements can then query as needed.

Network presence server 46 may include a Session Initial Protocol (SIP) client for communicating with other network elements. Relevant aspects of SIP are described in J. Rosenberg, et al., "SIP: Session Initiation Protocol," Request For Comments 3261 (June 2002) and in A. Roach, "SIP-Specific Event Notification," Internet Draft (July 2001), which are incorporated herein by reference. However, network presence server 46 may use other protocols instead of, or in addition to, SIP.

2. Exemplary Operation

Figure 2:
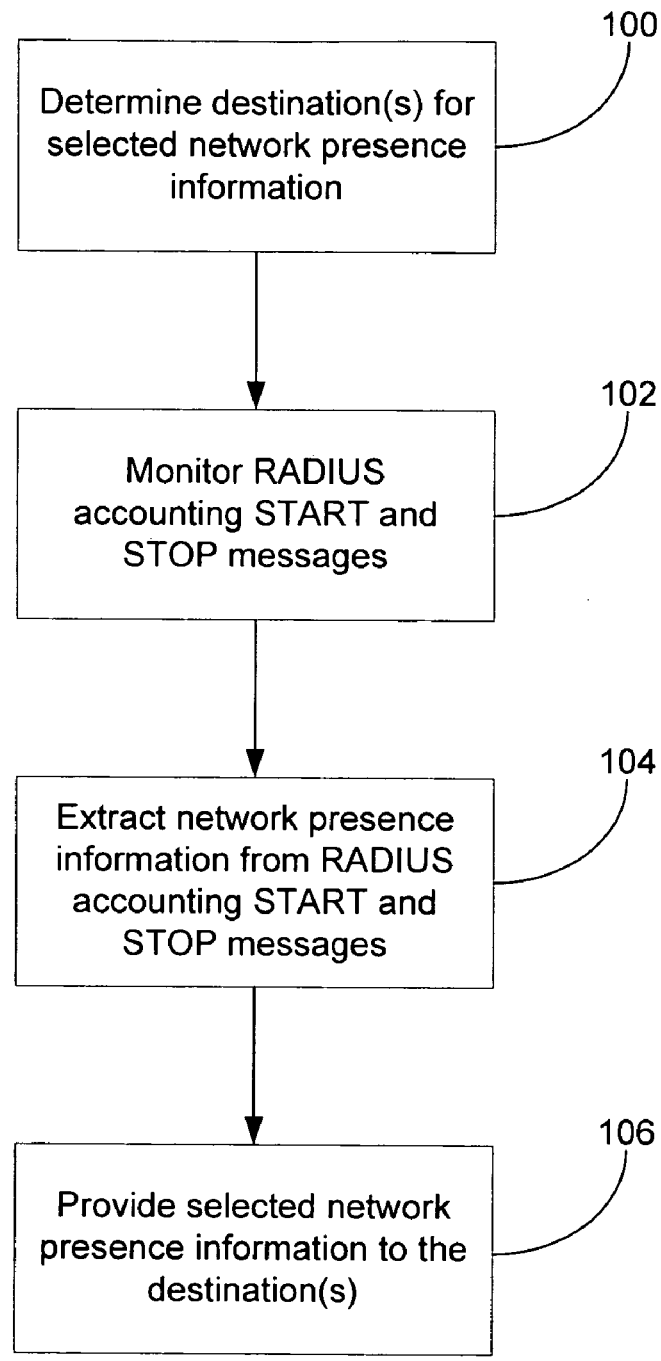
FIG. 2 is a flow chart, in accordance with an exemplary embodiment of the present invention.

FIG. 2 is a flow chart illustrating, at a high level, an exemplary method of obtaining and providing network presence information. This exemplary method may be carried out by network presence server 46 alone or by network presence server 46 in combination with one or more other network elements, such as AAA server 36.

In the first step, indicated by block 100, network presence server 46 determines which destination or destinations are to receive network presence information. In a preferred embodiment, network presence server 46 makes this determination based on a SIP SUBSCRIBE message that it receives. The SIP SUBSCRIBE message may identify, such as by network address, one or more destinations to receive the network presence information. The SIP SUBSCRIBE message may be sent by a network element corresponding to one of the identified destinations, or the message may be sent some other network element.

The SIP SUBSCRIBE message may also specify what types of network presence information each destination is to receive. The requested network presence information may include an identification of each customer, e.g., by NAI, and the network address being used by each customer. The customer's network address may be an IP address dynamically assigned to a particular customer device being used by the customer to access packet-switched network 12. The requested network presence information could also include the home agent address of the customer device (if Mobile IP is used), the MSID and/or MDN of the customer device (for the case of wireless customer devices), and session status information. Such session status information may include whether the customer device has begun or ended a network connection and/or whether the customer device is engaged in an active or dormant data session. The network presence information could also include other types of information, such as an identification of the type of device being used by the customer.

The SIP SUBSCRIBE message may also include filtering criteria specifying for which customers or customer devices a destination is to receive the selected network presence information. For example, the SIP SUBSCRIBE message may specify that a certain destination is to receive network presence information only for customer devices that use a particular home agent.

Finally, the SIP SUBSCRIBE message may specify when each destination is to receive the selected network presence information. For example, the SIP SUBSCRIBE message may specify that a destination is to receive the selected network presence information whenever a session begins or ends. In other cases, the SIP SUBSCRIBE message may specify that a destination is to receive the selected network presence information whenever the data session goes from active to dormant or vice versa, or that a destination is to receive the selected network presence information at regular time intervals.

In place of, or in addition to, receiving SIP SUBSCRIBE messages, the destinations for network presence information may be determined in other ways. For example, one or more default destinations may be used. Alternatively, other network elements may be queried to determine destinations for network presence information. Similarly, the types of network presence information to send, filtering criteria, and the times to send the network presence information may be determined by default or by querying another network element, instead of, or in addition to, relying on SIP SUBSCRIBE messages or any other type of message.

As indicated by block 102, status messages generated by PDSN 30 and/or wireline NAS 32, such as RADIUS accounting START and STOP messages, are continually monitored for selected network presence information. As noted above, PDSN 30 and wireline NAS 32 typically generate RADIUS accounting START and STOP messages and transmit them to AAA server 36. RADIUS accounting START and STOP messages typically include much useful network presence information. In this regard, each RADIUS accounting START and STOP message normally includes the NAI of the customer, the IP address being used by the customer device, the home agent of the customer device (if Mobile IP is being used), and the MDN and/or MSID of the customer device (if applicable). However, if a destination is to receive network presence information that cannot be gleaned from RADIUS accounting START and STOP messaged, then other information sources, such as directory 35, may also be monitored or queried.

If network presence server 46 is co-located with AAA server 36, then network presence server 46 may simply monitor the status messages that AAA server 36 receives. If network presence server 46 is a separate network element from AAA server 36, then AAA server 36 may forward the status messages it receives to network presence server 46. Alternatively, PDSN 30 and wireline NAS 32 may copy network presence server 46 on the status messages sent to AAA server 36, or network presence server 46 may query AAA server to obtain the status messages.

In any event, when the selected network presence information is encountered in the status messages, it is extracted, as indicated by block 104. The extracted network presence information may be stored in a data store, and it may be reviewed to determine whether any destination is to be notified of it. As indicated by block 106, one or more destinations are then provided with selected network presence information. This step may be accomplished by transmitting a SIP NOTIFY message containing the selected network presence information to each destination meant to receive it. However, the network presence information could be provided to each destination in other ways.

Figure 3:
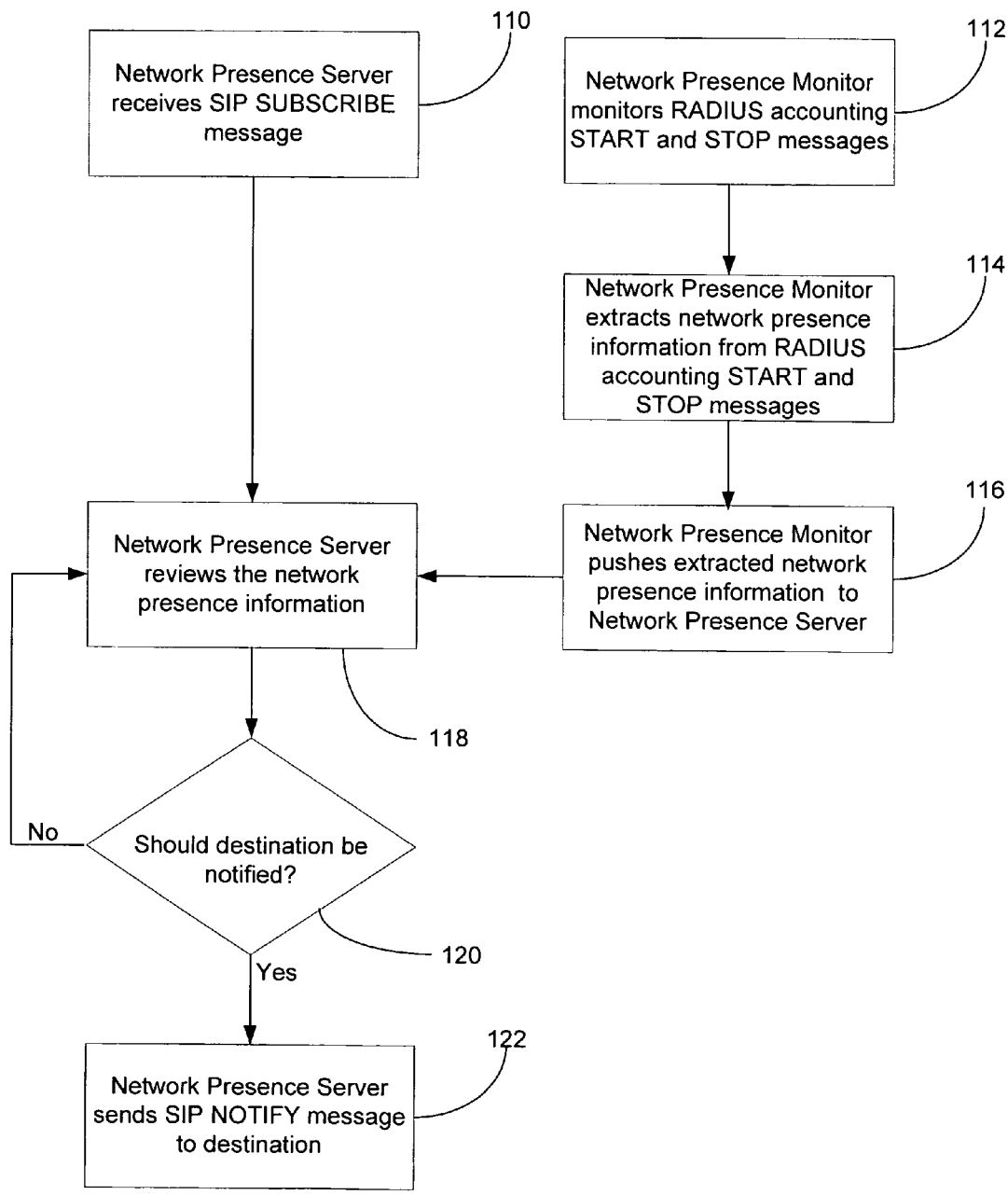
FIG. 3 is a flow chart, in accordance with an exemplary embodiment of the present invention.

FIG. 3 is a flow chart illustrating a more detailed example. In this example, network presence server 46 operates in conjunction with a network presence monitor that monitors RADIUS accounting START and STOP messages, extracts network presence information from the messages, and pushes the extracted information to network presence server 46, as described in more detail below. Various network elements could be used as such a network presence monitor. For example, since AAA server 36 normally receives RADIUS accounting START and STOP messages, AAA server 36 may be programmed to function as a network presence monitor. Alternatively, the network presence monitor may be a network element separate from AAA server 36.

The exemplary process of FIG. 3 begins with content gateway 42 sending a SIP SUBSCRIBE message to network presence server 46, as summarized in block 110. The SIP SUBSCRIBE message requests notification of the customer's NAI and IP address whenever a customer with home agent 34 begins and ends a session. In response, network presence server 46 sets content gateway 42 as the destination and waits to receive network presence information that satisfies the notification criteria set forth in the SIP SUBSCRIBE message.

Meanwhile the network presence monitor, e.g., AAA server 36, continually monitors the RADIUS accounting START and STOP messages from PDSN 30 and/or wireline NAS server 32 for selected network presence information, as indicated by block 112. The messages may be monitored for only the network presence information requested in the SIP SUBSCRIBE message, i.e., NAI and IP address. Alternatively, the network presence monitor may also monitor the messages for other types of network presence information, such as MDN, MSID, and/or home agent address. The network presence monitor may apply the filtering criterion set in the SIP SUBSCRIBE message, i.e., may monitor only messages from customer devices with home agent 34. Alternatively, the network presence monitor may monitor a larger set of messages, and network presence server 46 may do the requested filtering.

The network presence monitor extracts the network presence information it monitors from RADIUS accounting START and STOP records, as indicated by block 114. The network presence monitor pushes the extracted network presence information to network presence server 116. When network presence server 46 receives new network presence information, network presence server 46 reviews it, as indicated by block 118. In particular, network presence server determines whether any destination should be notified of the network presence information, as indicated by block 120. Thus, in this example, network presence server 46 would determine whether the network presence information includes any of the network presence information requested in the SIP SUBSCRIBE message, i.e., NAI and IP address, whether it meets the filtering criteria, i.e., corresponds to a customer device with home agent 34, and whether it meets the timing criteria, i.e., corresponds to a data session either being initiated or terminated. As noted above, a RADIUS accounting START message corresponds to the beginning of a new session when the session involving the NAI and IP address was not previously dormant. A RADIUS accounting STOP message corresponds to the end of a session when it does not include a flag indicating the session is being continued, i.e., that the session has simply become dormant.

If the new network presence information meets the criteria for notifying the destination, then network presence server 46 sends the destination a SIP NOTIFY message containing the new network presence information, as indicated by block 122. Thus, in this example, network presence server 46 would send content gateway 42 a SIP NOTIFY message containing the customer NAI and IP address and an indication whether the customer's data session has begun or ended. In this way, content gateway 42 may be notified when the network presence of customers begins and ends and also which customer NAIs correspond to which IP addresses that content gateway 42 may encounter. If the new network presence information does not need to be sent to any destination, then network presence server 46 may store it and go back to the state of reviewing any new network presence information that is pushed to it.

As noted above, content gateway 42 is only one example of a destination that network presence server 46 may send network presence information. In general, the destination may be any application, data store, or any other destination that network presence server 46 identifies to receive network presence information. The selected network presence information sent to a destination may also include parameters other than NAI and IP address. In addition to the beginning and ending of sessions, network presence server 46 may send a destination the selected network presence information at other times, such as when the session status changes from active to dormant or from dormant to active.

Figure 4:
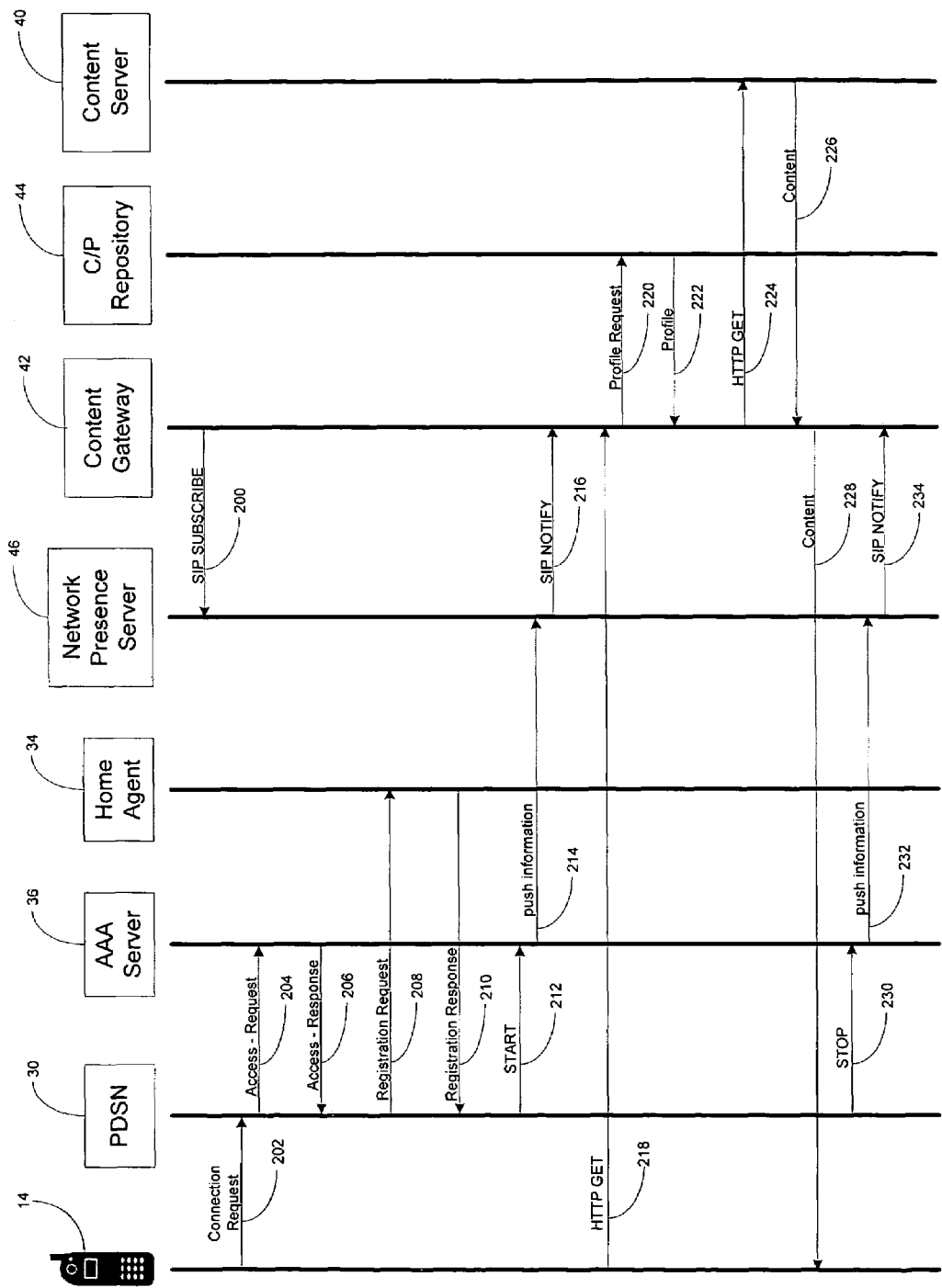
FIG. 4 is a simplified call flow diagram, in accordance with an exemplary embodiment of the present invention.

FIG. 4 is a simplified call flow diagram further illustrating an exemplary operation. At step 200, network presence server 46 receives a SIP SUBSCRIBE message from content gateway 42. The SIP SUBSCRIBE message of step 200 identifies content gateway 42 as the destination or subscribing application to receive network presence information. The SIP SUBSCRIBE message also specifies which selected network presence information content gateway 42 is to receive and when content gateway 42 is to be notified. For example, the SIP SUBSCRIBE message may specify that content gateway 42 is to be notified of the NAI and IP address of each customer using home agent 34 whenever the customer's session begins or ends. The SIP SUBSCRIBE message might also specify other identifying information, such as MSID and/or MDN.

A customer using mobile station 14 wishes to access content available on content server 40. For example, the customer may wish to access Web content at a URL corresponding to content server 40. In this case, mobile station 14 is configured to use the Wireless Application Protocol (WAP) to access such content, and content gateway 42 serves as the WAP gateway for content server 40.

To begin the desired data session, mobile station 14 transmits a connection request that is received by PDSN 30, as indicated by step 202. The connection request includes the customer's NAI and password. For purposes of authentication, PDSN 30 sends the NAI and password to AAA server 36 in a RADIUS Access-Request message, as indicated by step 204. In response, AAA server 36 determines that the NAI and password are valid and so signals PDSN 30 in a RADIUS Access-Response message, as shown by step 206.

In this example, mobile station 14 uses Mobile IP and is assigned to home agent 34. Accordingly, in step 208, PDSN 30 sends a Mobile IP Registration Request to home agent 34. In response, home agent 34 dynamically assigns an IP address to mobile station 14. In step 210, home agent 34 sends PDSN 30 a Mobile IP Registration Response that includes the IP address dynamically assigned to mobile station 14.

In accordance with the RADIUS accounting protocol, PDSN 30 then sends a RADIUS accounting START message to AAA server 36, as indicated by step 212. In this example, AAA server 36 acts as a network presence monitor. Accordingly, AAA server 36 extracts network presence information, including the customer's NAI, IP address, and home agent address, from the RADIUS accounting START message of step 212 and pushes the network presence information to network presence server 46, as indicated by step 214.

Network presence server 46 receives the network presence information and determines that it meets the criteria set forth in the SIP SUBSCRIBE message of step 200, in that a customer assigned to home agent 34 has just begun a new data session. Accordingly, network presence server 46 sends content gateway 42 a SIP NOTIFY message, as indicated by step 216. The SIP NOTIFY message contains the selected network presence information specified in the SIP SUBSCRIBE message of step 200, e.g., the customer's NAI and IP address and an indication that the customer has just begun a data session.

In some cases, all of the selected network presence information specified in the SIP SUBSCRIBE message and provided in the SIP NOTIFY message may be included in the network presence information pushed to network presence server 46 in step 214. In other cases, network presence server 46 may need to query other network elements, such as directory 35, to obtain all of the information specified in the SIP SUBSCRIBE message. For example, the SIP SUBSCRIBE message may specify MDN, whereas the information pushed to network presence server may include MSID instead of MDN. Then, to obtain MDN, network presence server 46 may query directory 35 to determine what MDN corresponds to the MSID that network presence server 46 received.

In this way, content gateway 42 is notified that this particular IP address is valid and corresponds to a particular NAI. In addition, content gateway 42 may also obtain key identifying information, such as NAI and/or MDN. Content gateway 42 may store the network presence information obtained in step 216.

In step 218, mobile station 14 sends content gateway 42 an access request. In this example, the access request is a Hyper-Text Transfer Protocol (HTTP) GET request that requests access to content at a URL corresponding to content server 40. The access request also identifies a destination address to receive the content, namely, the IP address dynamically assigned to mobile station 14. The access request may also identify the customer by NAI. In addition, the access request may identify a profile of device capabilities and/or customer preferences available from C/P repository 44.

Content gateway 42 determines whether the destination address provided in the access request of step 218 corresponds to a valid IP address identified by network presence server 46. In this case, content gateway 42 determines that the destination address is valid because it corresponds to the valid customer IP address from the SIP NOTIFY message of step 216. As noted above, the SIP NOTIFY message of step 216 also identified the NAI corresponding to the IP address. Thus, if the access request of step 218 did not already include an NAI, content gateway 42 may determine the customer's NAI, based on the destination IP address contained in the access request of step 218.

Content gateway 42 may use the customer's NAI in different ways. For example, content gateway 42 may request a customer's profile from C/P repository 44, as indicated by step 220. The profile request of step 220 may identify the customer by NAI. C/P repository 44 may then provide the requested profile in response, as indicated by step 222. The profile may specify the capabilities of mobile station 14 and/or customer preferences. Content gateway 42 may use this information to tailor the content forwarded to mobile station 14, as described in more detail below.

Content gateway 42 may forward to content server 40 the HTTP GET request, or other access request received from mobile station 14, as indicated by step 224. More particularly, content gateway 42 may receive the access request of step 218, modify it, and then forward the modified access request to content server 40 in step 224. Content gateway 42 may modify the access request by inserting identifying information into a header field of the access request. As described in more detail below, the identifying information that content gateway 42 inserts into the access request may include user identifiers, such as NAI, and/or device identifiers, such as MDN. The specific identifying information that content gateway 42 inserts into the access request may depend on the requirements of the particular content server that is to receive the access request. For example, some content servers may require both NAI and MDN, whereas other content servers may require only NAI. Still other content servers may not require any identifying information.

In response to the access request of step 224, content server 40 provides content gateway 42 with the requested content, as indicated by step 226. Content gateway 42 then provides the requested content to mobile station 14, as indicated by step 228. In so doing, content gateway 42 may tailor the content provided to mobile station 14 based on the profile it received in step 222. This tailoring may include transcoding or rendering the content to accommodate the particular capabilities of mobile station 14 and/or the particular preferences of the customer.

At some point, the data session of mobile station 14 ends. This may occur, for example, because mobile station 14 has logged out, been turned off, moved out of range, or been dormant for a certain period of time. When the data session ends, PDSN 30 sends a RADIUS accounting STOP message to AAA server 36, as indicated by step 230. AAA server 36, in turn, extracts network presence information from the RADIUS accounting STOP message, including the NAI and IP address, and pushes the information to network presence server 46, as indicated by step 232. Network presence server 46 then sends content gateway 42 a SIP NOTIFY message indicating that the NAI and IP address have ended the data session, as indicated by step 234. As a result, content gateway 42 no longer treats the IP address as a valid destination address for providing content and no longer applies the profile previously associated with that IP address. If content gateway 42 thereafter receives an access request having that IP address as its destination address, content gateway 42 may determine that the IP address either belongs to a different customer, in which case content gateway 42 should have already received network presence notification that the IP address corresponds to a different customer NAI, or is invalid. If content gateway 42 is not able to validate the IP address presented in an access request, then content gateway 42 may refuse to provide the requested content to the IP address.

3. Insertion of Identifying Information

As noted above, content gateway 42 may insert identifying information into access requests from mobile station 14 in order to identify mobile station 14 to content server 40. The inserted identifying information may include the user's NAI, as described above. In general, however, the inserted identifying information could include one or more identifiers, such as MDN, instead of or in addition to NAI. Thus, in an exemplary embodiment, content gateway 42 may insert both NAI and MDN into the access requests that it forwards to content servers. Content gateway 42 may insert some or all of the identifying information in encrypted form.

In some cases, the identifiers inserted by content gateway 42 may be included in the network presence information that network presence server 46 transmits to content gateway 42, e.g., in SIP NOTIFY messages. For example, when a mobile station begins a session, content gateway 42 may receive a SIP NOTIFY message from network presence server 46 containing the NAI, MDN, and IP address for the mobile station. Content gateway 42 stores this correlation between NAI, MDN, and IP address. Then, when content server 42 receives an access request with that includes that particular IP address, content server 42 determines the corresponding NAI and MDN, based on the IP address contained in the access request and on the stored correlation. Content gateway 42 then inserts the NAI and MDN into the access request that it forwards to content server 40.

In other cases, however, the SIP NOTIFY messages may not contain all of the identifying information that content gateway 42 inserts into access requests. For example, content gateway 42 may insert both NAI and MDN into access requests, whereas the network presence information provided by network presence server 46 might include only one of these two identifiers. In such cases, content gateway 42 may obtain additional identifying information by querying other network elements, such as directory 35, using the identifying information that is provided by network presence server 46. For example, if the network presence information provided by network presence server 46 includes MSID, then content gateway may query directory 35 to obtain the corresponding MDN. In this way, the identifying information that content gateway 42 inserts into access requests may be based, at least in part, on the network presence information provided by network presence server 46.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for communication between a mobile station and a content server, said mobile station being identified by at least a first identifier, a second identifier, and a third identifier, said method comprising:
    obtaining a first correlation between said first identifier and said third identifier;
    obtaining a second correlation between said third identifier and said second identifier;
    receiving an access request from said mobile station, said access request requesting access to selected content, said access request including said first identifier;
    determining said second identifier based on said first identifier and said first and second correlations;
    inserting identifying information into said access request to provide a modified access request, said identifying information including at least said second identifier; and
    transmitting said modified access request to said content server.

2. The method of claim 1, wherein said first identifier is a network address.

3. The method of claim 2, wherein said network address is an Internet Protocol (IP) address.

4. The method of claim 3, wherein said IP address has been dynamically assigned to said mobile station.

5. The method of claim 2, wherein said second identifier is a user identifier.

6. The method of claim 5, wherein said user identifier is a network access identifier (NAI).

7. The method of claim 2, wherein said second identifier is a device identifier.

8. The method of claim 7, wherein said device identifier is a mobile directory number (MDN).

9. The method of claim 1, wherein obtaining a first correlation between said first identifier and said third identifier comprises:
    receiving a network presence notification message, said network presence notification message including said first identifier and said third identifier.

10. The method of claim 1, wherein obtaining a second correlation between said third identifier and said second identifier comprises:
    transmitting a query to a directory, said query including said third identifier; and
    receiving a response from said directory, said response including said second identifier.

11. The method of claim 10, wherein said first identifier is an Internet Protocol (IP) address, said second identifier is a mobile directory number (MDN), and said third identifier is a network access identifier (NAI).

12. The method of claim 1, wherein said identifying information includes at least said second identifier and said third identifier.

13. The method of claim 12, wherein said second identifier is a network access identifier (NAI) and said third identifier is a mobile directory number (MDN).

14. The method of claim 1, wherein said access request is a HyperText Transfer Protocol (HTTP) GET request.

15. A method for communication between a mobile station and a content server, via a gateway, said mobile station being identified by at least a first identifier, a second identifier, and a third identifier, said method comprising:
- a network presence server transmitting network presence information regarding said mobile station to said gateway, said network presence information including at least said first identifier and said second identifier;
- said gateway storing said network presence information;
- said gateway receiving an access request from said mobile station, said access request requesting access to selected content, said access request including said first identifier;
- said gateway determining said second identifier based on said first identifier and said network presence information;
- said gateway inserting at least said second identifier and said third identifier into said access request to provide a modified access request; and
- said gateway transmitting said modified access request to said content server.

16. The method of claim 15, wherein said first identifier is a network address.

17. The method of claim 16, wherein said network address is an Internet Protocol (IP) address.

18. The method of claim 15, wherein said second identifier is a user identifier.

19. The method of claim 18, wherein said user identifier is a network access identifier (NAI).

20. The method of claim 15, wherein said second identifier is a device identifier.

21. The method of claim 20, wherein said device identifier is a mobile directory number (MDN).

22. The method of claim 15, wherein said second identifier is a network access identifier (NAI) and said third identifier is a mobile directory number (MDN).

23. The method of claim 15, wherein said network presence information further includes said third identifier.

24. The method of claim 23, further comprising:
- said gateway determining said third identifier based on said first identifier and said network presence information.

25. The method of claim 15, further comprising said gateway determining said third identifier by:
- (a) transmitting a query to a directory, said query including said second identifier; and
- (b) receiving a response from said directory, said response including said third identifier.

26. The method of claim 15, further comprising:
- obtaining said network presence information, at least in part, from status messages transmitted from a network access server to an accounting server regarding services provided to said mobile station.

27. The method of claim 26, wherein said network presence information includes said third identifier, further comprising said network presence server obtaining said third identifier by:
- (a) transmitting a query to a directory, said query including said second identifier; and
- (b) receiving a response from said directory, said response including said third identifier.

* * * * *

UNITED STATES PATENT AND TRADEMARK OFFICE
CERTIFICATE OF CORRECTION

| | |
|---|---|
| PATENT NO. | : 7,602,795 B1 |
| APPLICATION NO. | : 10/832922 |
| DATED | : October 13, 2009 |
| INVENTOR(S) | : Tania Mazza-Deblauwe |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1515 days.

Signed and Sealed this

Fifth Day of October, 2010

David J. Kappos
*Director of the United States Patent and Trademark Office*